United States Patent
Homison et al.

(10) Patent No.: US 11,753,986 B1
(45) Date of Patent: Sep. 12, 2023

(54) METHODS AND SYSTEMS FOR TURBOCHARGER

(71) Applicant: Transportation IP Holdings, LLC, Norwalk, CT (US)

(72) Inventors: Christopher Homison, Wattsburg, PA (US); Louis Kobielski, Sherman, NY (US); Adam Felton, Grove City, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 18/161,595

(22) Filed: Jan. 30, 2023

Related U.S. Application Data (60) Provisional application No. 63/268,399, filed on Feb. 23, 2022.

(51) Int. Cl.
| | |
|---|---|
| *F02B 37/24* | (2006.01) |
| *F02B 37/013* | (2006.01) |
| *F02B 37/18* | (2006.01) |
| *F02B 37/16* | (2006.01) |
| *F02B 37/00* | (2006.01) |

(52) U.S. Cl.
CPC ............ *F02B 37/24* (2013.01); *F02B 37/013* (2013.01); *F02B 37/16* (2013.01); *F02B 37/18* (2013.01); *F02B 37/183* (2013.01); *F02B 37/004* (2013.01)

(58) Field of Classification Search
CPC ........ F02B 37/18; F02B 37/183; F02B 37/16; F02B 37/162; F02B 37/24; F02B 37/22; F02B 37/004; F02B 37/013
See application file for complete search history.

(56) References Cited

U.S. PATENT DOCUMENTS

| | | | |
|---|---|---|---|
| 9,316,180 B2 * | 4/2016 | Heiermann | ........... F02B 37/004 |
| 10,907,497 B2 | 2/2021 | Kobielski et al. | |

* cited by examiner

*Primary Examiner* — Ngoc T Nguyen
(74) *Attorney, Agent, or Firm* — McCoy Russell LLP (57) ABSTRACT

Methods and systems are provided for controlling a power output of a power source using a fluidic variable turbine turbocharger. In one example, a turbocharger system coupled to the power source includes a first turbocharger having a first compressor and a first turbine, and a second turbocharger having a second compressor and a second turbine, where boost air from the second compressor is directed to only a nozzle of the first turbine.

20 Claims, 7 Drawing Sheets

METHODS AND SYSTEMS FOR TURBOCHARGER

BACKGROUND

Cross Reference to Related Applications

The present application claims priority to U.S. Provisional Application No. 63/268,399, entitled "METHODS AND SYSTEMS FOR TURBOCHARGER", and filed on Feb. 23, 2022. The entire contents of the above-listed application are hereby incorporated by reference for all purposes.

TECHNICAL FIELD

Embodiments of the subject matter disclosed herein relate to turbocharged power sources, and more specifically, to power sources coupled to a multi-stage turbocharger.

DISCUSSION OF ART

Some power sources may use a turbocharger to control power output and/or efficiency of the power source by increasing an amount of compressed air input into the power source. Exhaust gases from the power source may spin a turbine coupled to a compressor that provides the compressed air. One type of turbine is a fluidic variable turbine (FVT). The FVT may differ from other turbines in that it may selectively adjust a power output by adjusting a throat area of a FVT nozzle. The throat area of the FVT nozzle may be changed by adjusting a gas flow to the FVT nozzle, which may adjust an effective area of the FVT nozzle. It may be desirable to have a system and method that differs from those that are currently available.

BRIEF DESCRIPTION

In one embodiment, the current disclosure provides support for a turbocharger system coupled to the power source includes a first turbocharger having a first compressor and a first turbine, and a second turbocharger having a second compressor and a second turbine, where boost air from the second compressor is directed to only a nozzle of the first turbine.

In another embodiment, the current disclosure further provides support for a method for a turbocharger system. During a first condition, the method incudes flowing boost air from a first compressor to a power source and, during a second condition, flowing boost air from the first compressor to the power source and to a second compressor, wherein the second compressor flows boost air to a nozzle of a first turbine coupled to the first compressor via a shaft of a first turbocharger.

In a further embodiment, the current disclosure further provides support for a system, comprising a first turbocharger fluidly coupled to a power source and to a second turbocharger, where the second turbocharger receives boost from the first turbocharger and flows boost to a nozzle of a first turbine of the first turbocharger.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
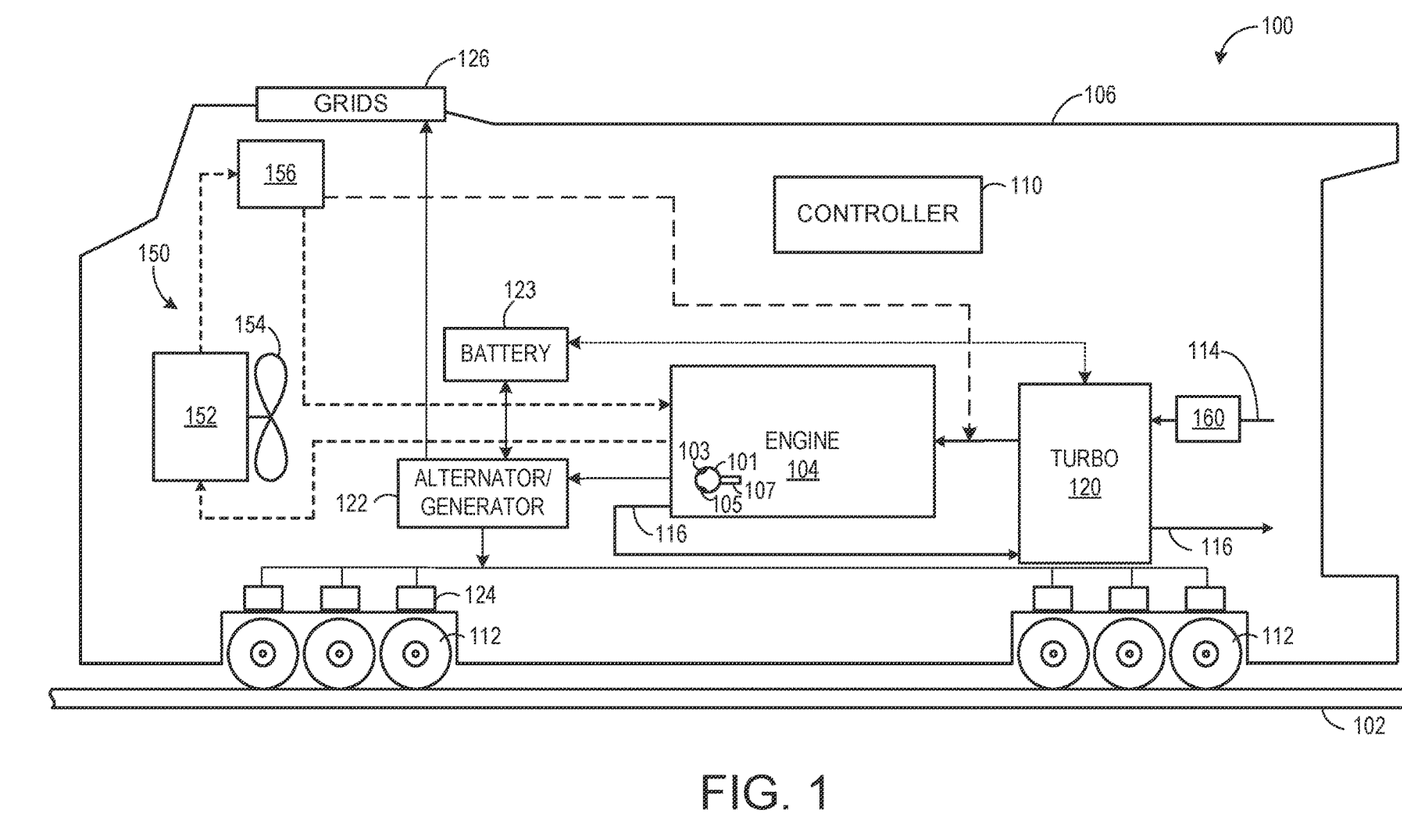
FIG. 1 shows a schematic diagram of a vehicle with an engine comprising a turbocharger system, according to an embodiment of the present disclosure.
Figure 2A:
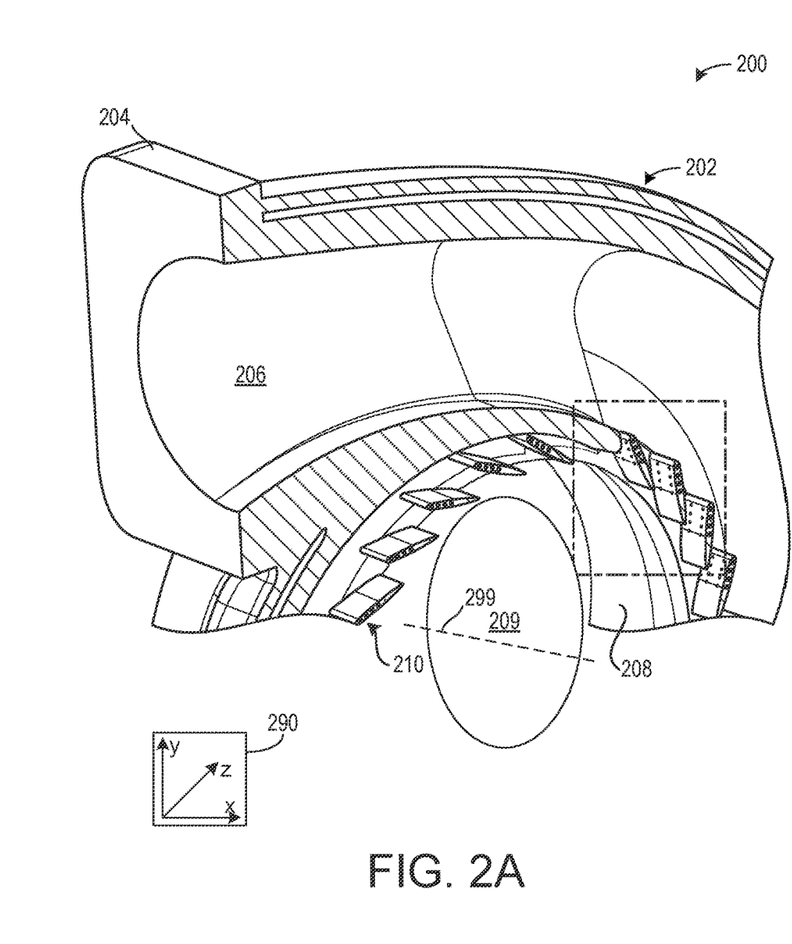
FIGS. 2A and 2B shows a first embodiment of a fluidic variable turbine (FVT) having nozzle vanes adapted to inject air to adjust a throat area of the turbine.
Figure 2B:
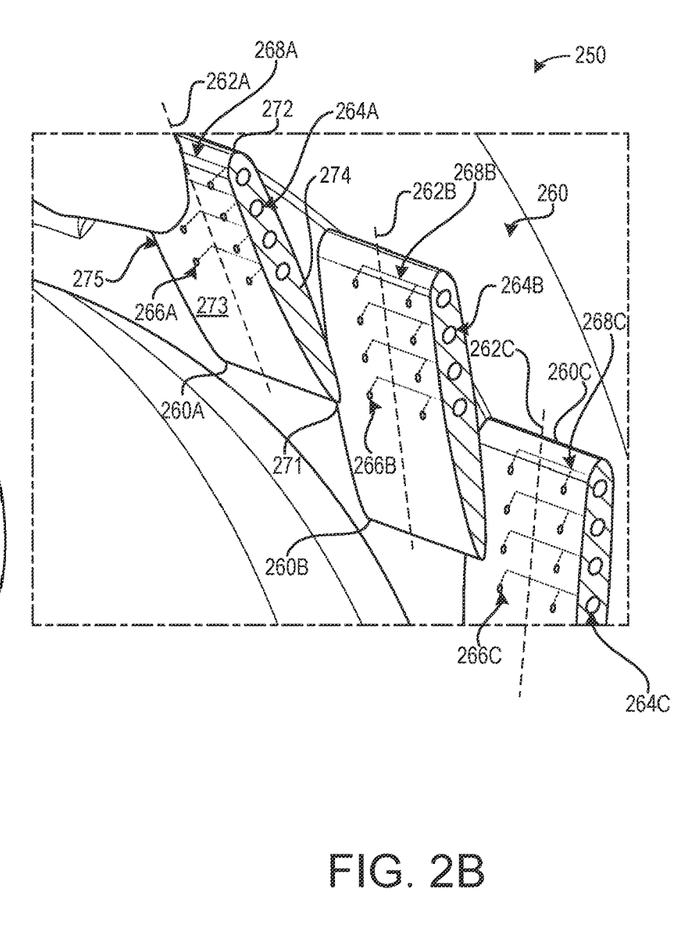
Figure 3A:
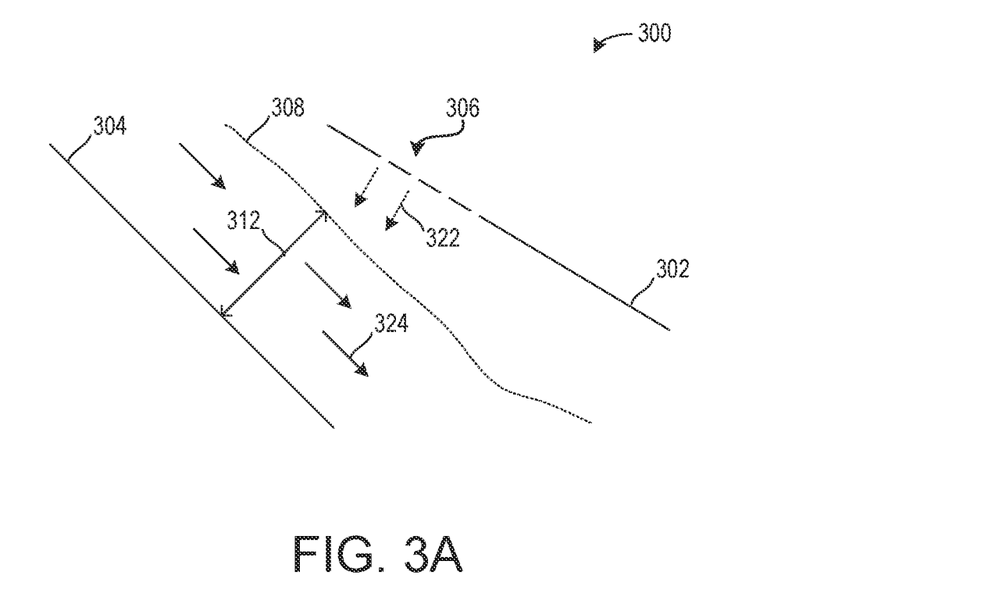
FIGS. 3A and 3B show examples of a smaller boundary layer and a larger boundary layer for adjusting the throat area of the turbine.
Figure 3B:
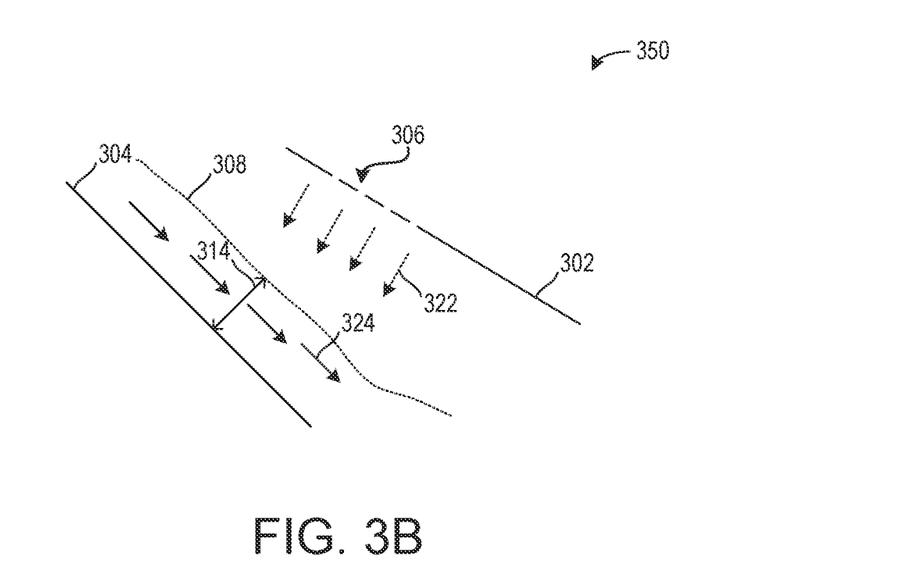
Figure 4:
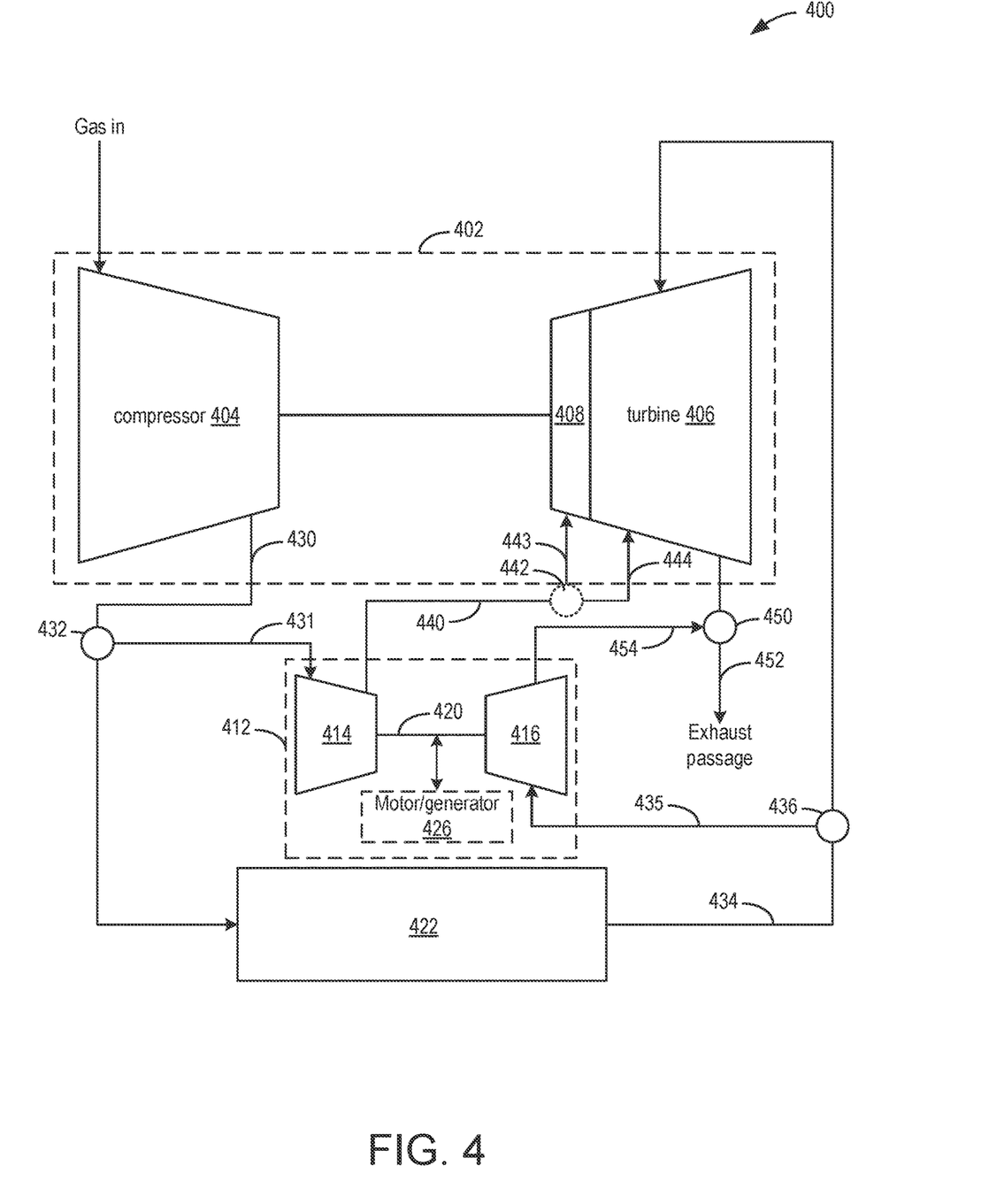
FIG. 4 shows an embodiment of the turbocharger system with a first turbocharger and a second turbocharger.

This description and embodiments of the subject matter disclosed herein relate to methods and systems for increasing a power output and/or efficiency of a power source using a multi-stage turbocharger. In one example, a first stage of the multi-stage turbocharger includes a turbocharger with a fluidic variable turbine (FVT). A second stage of the multi-stage turbocharger may include an assist turbocharger. A turbocharger system, including the FVT turbocharger and the assist turbocharger, is coupled to the power source, as shown in FIG. 1. Examples of the FVT are shown in FIGS. 2A and 2B. Different throat areas of the FVT are shown in FIGS. 3A and 3B. A detailed schematic view of the turbocharger system and its fluidic coupling to a system including the power source is shown in FIG. 4.

Figure 5:
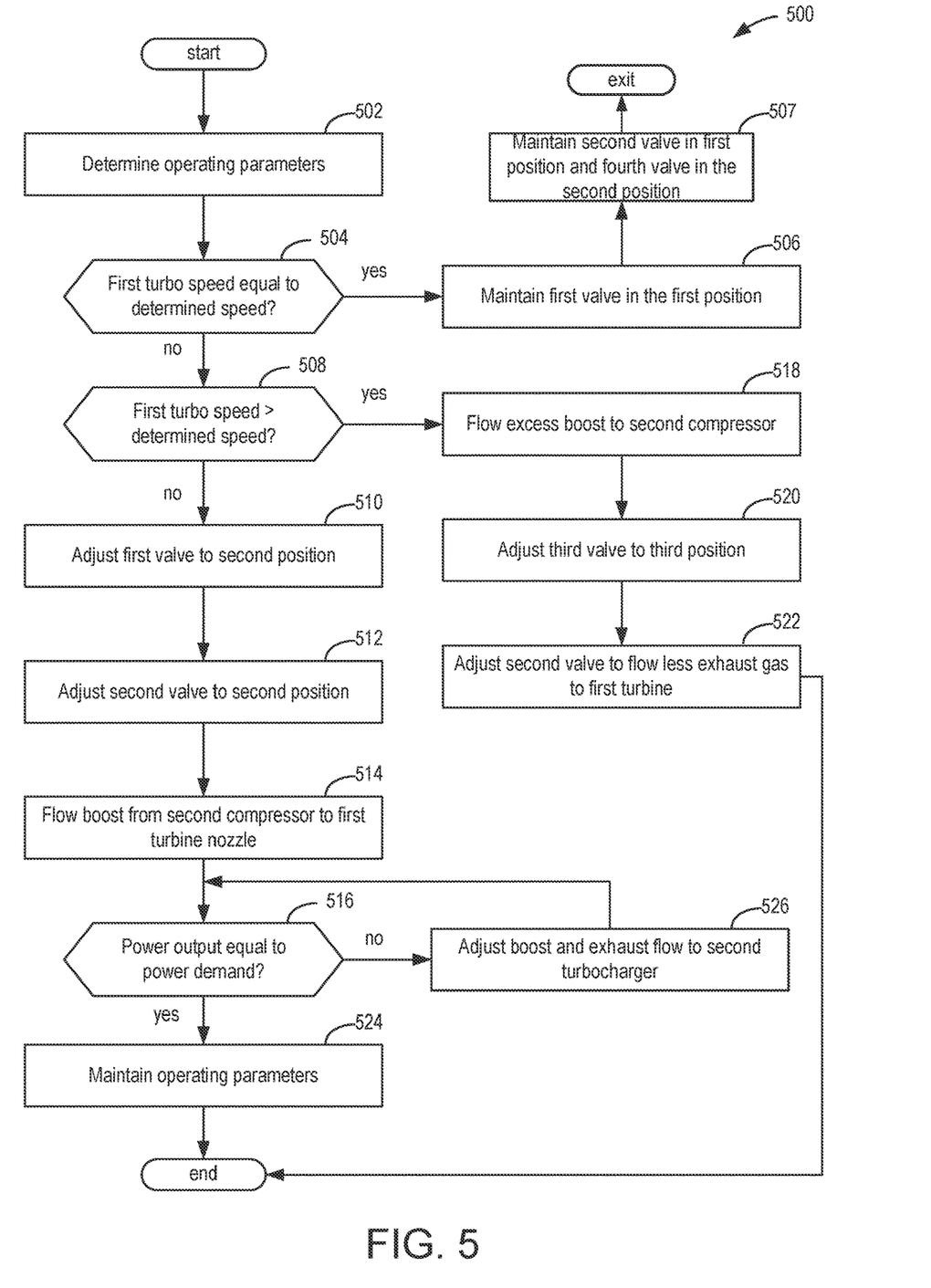
FIG. 5 shows a method for adjusting operation of the second turbocharger in response to a speed of the first turbocharger.
Figure 6:
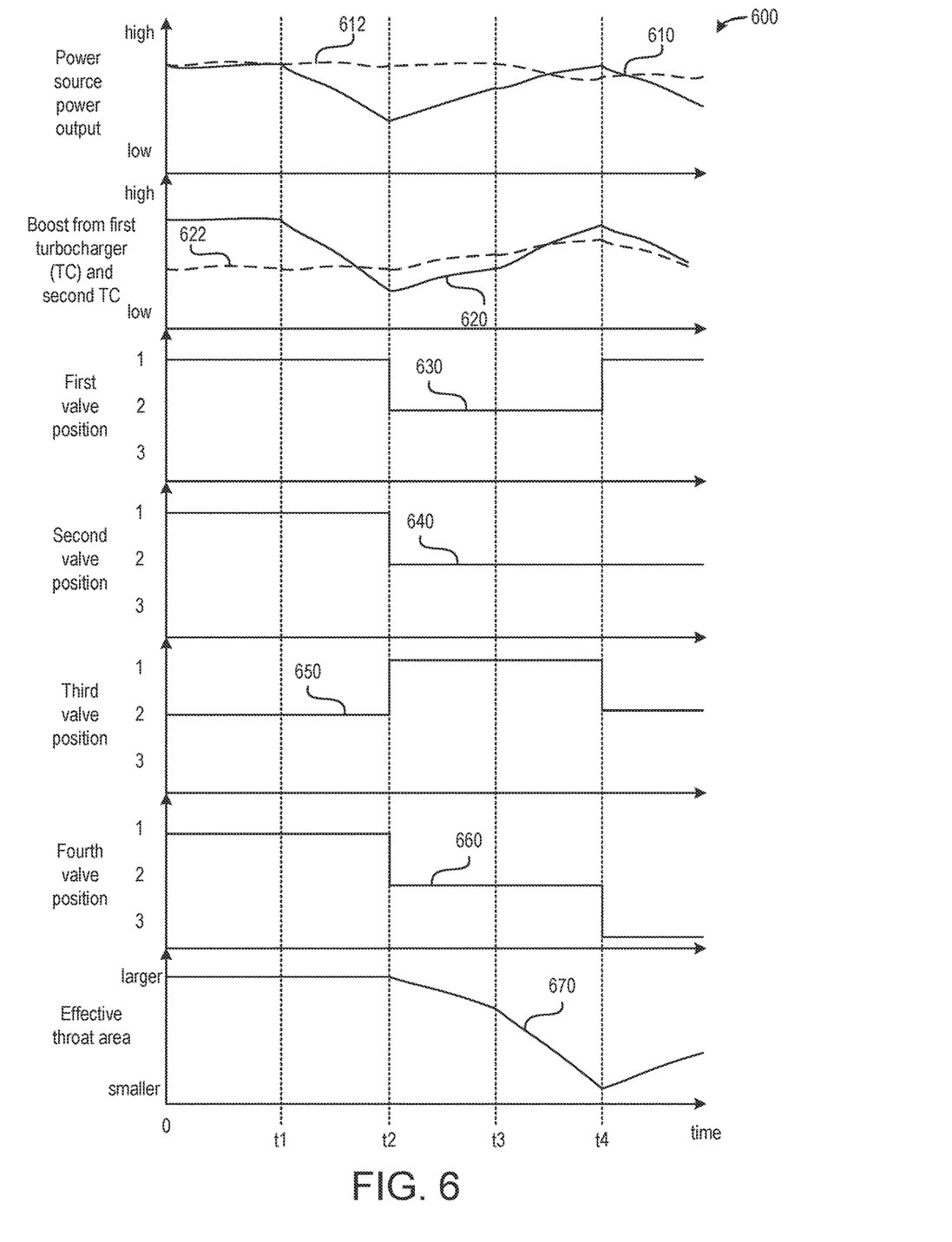
FIG. 6 shows an engine operating sequence illustrating changes to turbocharger system parameters.
Figure 7:
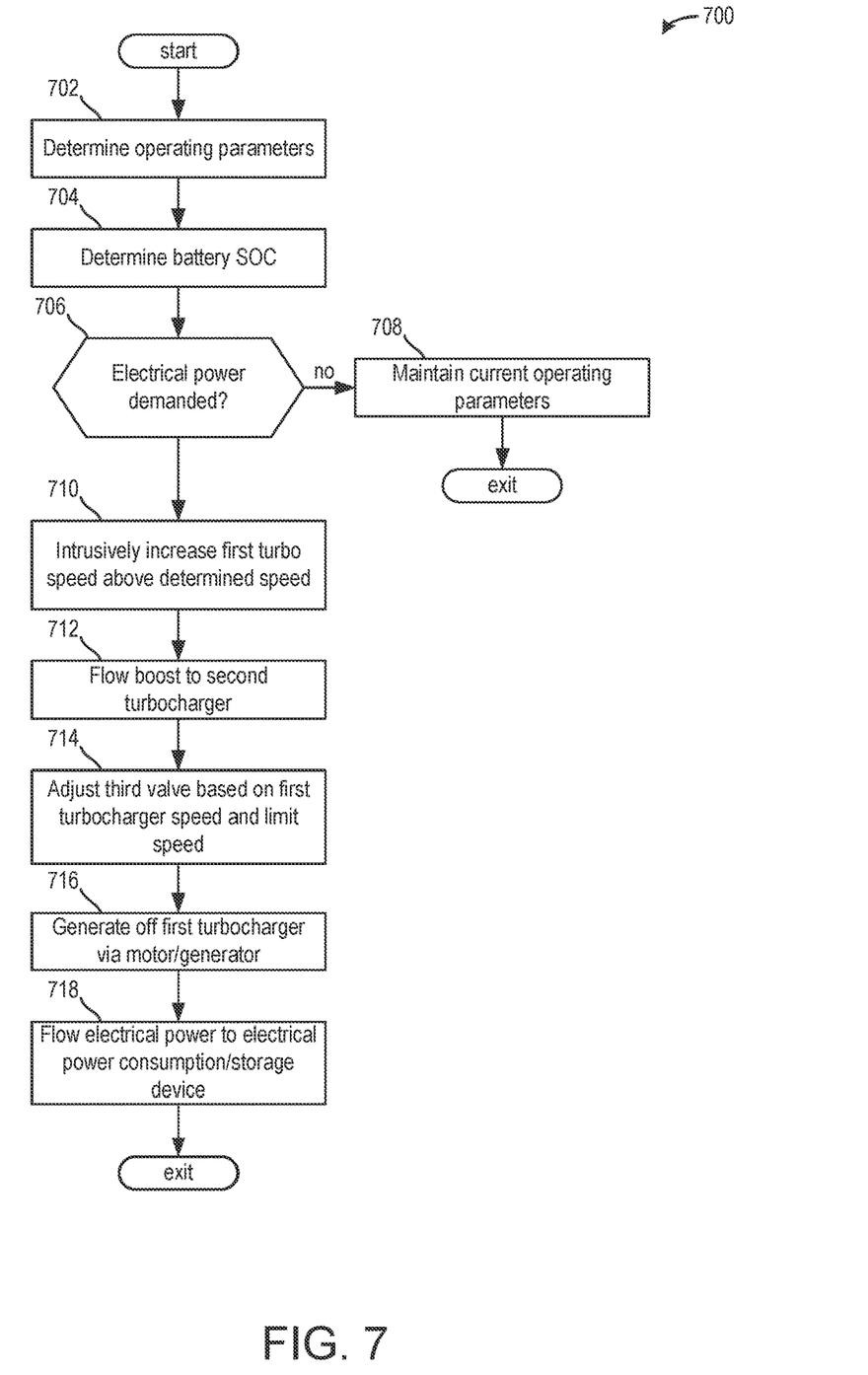
FIG. 7 shows a method for adjusting valves of the turbocharger system in response to a power output demand being met.

Operation of the turbocharger system may be modified to control an operating parameter of the FVT turbocharger and the assist turbocharger. A method for adjusting operation of the assist turbocharger in response to a speed of the FVT turbocharger is shown in FIG. 5. An operating sequence illustrating changes to valve positions, power source power output, and a throat area of the FVT turbocharger is shown in FIG. 6. A method for adjusting operation of the turbocharger system to increase regeneration from the first turbocharger is shown in FIG. 7.

Boost air from the compressor of the assist turbocharger may be directed to a nozzle of the FVT to adjust a throat area of the nozzle. In other examples which may include a FVT turbocharger and a power source, a portion of boost air from the compressor of the FVT turbocharger may be injected into the nozzle of the FVT to adjust a throat area of the nozzle. However, this may result in turbo lag. Additionally or alternatively, boost air from the compressor may be lower in pressure than exhaust gas from the power source. In other examples, boost air may be provided by an auxiliary device, such as a blower. The portion of boost air from the blower may be at a lower pressure than power source exhaust during some conditions, thereby rendering the blower unusable. Thus, full variability of the FVT turbocharger may not be achieved. It may be desirable to have a system in which boost air injected into the nozzle of the FVT is supplied at a higher pressure than the pressure of exhaust gas from the power source during a wider range of conditions without use of an external source of gas. By doing this, the FVT may drive a flow rate to maximize a throat area reduction of the nozzle during a greater range of conditions.

A system and method are disclosed herein for increasing variability of the FVT turbocharger compared to a level of variability achieved with conventional systems. The disclosed system includes implementing an assist turbocharger with turbine gas connections arranged in parallel with the FVT turbocharger. Compressor gas connections may direct a portion of boost air from the compressor of the FVT turbocharger into the compressor of the assist turbocharger, and may direct boost air from the compressor of the assist turbocharger to the nozzle of the FVT. The assist turbocharger may provide boost air at higher pressures compared to exhaust gas injected to the FVT turbine due to the turbine of the assist turbocharger being optionally powered by exhaust gas. In this way, the effective area of the nozzle of the FVT may be adjusted during a full range of engine operating conditions. Additionally or alternatively, the assist turbocharger may include a variable geometry turbine (VGT) and/or an electric machine. For example, an injection pressure of compressed air (e.g., boost air) directed to the nozzle of the first turbine from the second compressor may be controlled using the VGT and/or electric machine of the second turbocharger. As described herein, a VGT is a turbine which may have moving components (e.g., pivotable or slideable vanes) or stationary vanes within a nozzle ring of the turbine to adjust a geometry of the turbine by adjusting a throat area of the nozzle of the turbine.

In this way, variability of the FVT turbocharger may be increased without use of additional parts and mechanical complexity associated with using an external injection gas supply, such as shop air or a downstream compressor stage. Additionally, the assist turbocharger may be small (e.g., at least one of a smaller area, diameter, and volume), relative to the FVT turbocharger, and may be an off-the-shelf turbocharger, which may reduce system footprint, weight, and/or complexity and thus provide a simple solution to enable high variability for the FVT turbocharger.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the disclosure. In another embodiment, the turbocharger system may be disposed in a vehicle such as an automobile or a truck. In still other embodiments, the vehicle system may include agricultural equipment, industrial equipment, or any other equipment that relies on tractive effort generated by a combination of one or more engines and one or more motors. In further embodiments, the turbocharger system may be implemented in a vehicle system or a non-vehicle system using a power source which may be an internal combustion engine or may be a different power source, such as a heat source, a heat exchanger, a battery cooling system, a fuel cell, a generator, and so on.

In some examples, the power source coupled to the turbocharger may be an internal combustion engine (ICE), which may operate via a combination of different fuels or only a single fuel. These fuels may have relatively different amounts of carbon. In one example, the ICE may be a multi-fuel engine that combusts a plurality of fuels. Each of the plurality of fuels may be stored in separate fuel tanks. In one embodiment, one or more of the fuels and its corresponding fuel tank may be housed in a different fuel tank including a different fuel. In one example, a gaseous fuel tank comprising a gaseous fuel may be arranged within an interior volume of a liquid fuel tank comprising a liquid fuel.

The ICE may combust one or more of gasoline, diesel, hydrogenation-derived renewable diesel (HDRD), alcohol(s), ethers, ammonia, biodiesels, hydrogen, natural gas, kerosene, syn-gas, and the like. The plurality of fuels may include gaseous fuels, liquid fuels, and solid fuels, alone or in combination. A substitution rate of a first fuel of the ICE with a second fuel may be determined based on a current engine load. In one embodiment, the substitution rate may correspond to an injection amount of a fuel with a relatively lower carbon content or zero carbon content (e.g., hydrogen gas or ammonia). As the substitution rate increases, the relative proportion of fuel with the lower or zero carbon content increases and the overall amount of carbon content in the combined fuel lowers. Additionally or alternatively, the substitution rate may correspond to an injection amount or delivery of a gaseous fuel relative to a liquid fuel.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 1 shows an embodiment of a system in which a turbocharger system may be installed. Specifically, FIG. 1 shows a block diagram of an embodiment of a vehicle system 100, herein depicted as a vehicle 106. The illustrated vehicle runs on a rail 102 via a plurality of wheels 112. As depicted, the vehicle includes an engine 104. In one example, the engine is a power source. The engine includes a plurality of cylinders 101 (only one representative cylinder shown in FIG. 1) that each include at least one intake valve 103, exhaust valve 105, and fuel injector 107. Each intake valve, exhaust valve, and fuel injector may include an actuator that may be actuated via a signal from a controller 110 of the engine. In other non-limiting embodiments, the engine may be a stationary engine, such as in a power-plant application, or an engine in a marine vessel or other on- or off-highway vehicle propulsion system as noted above.

The engine receives intake air for combustion from an intake passage 114. The intake passage comprises an air filter 160 that filters air from outside of the vehicle. Exhaust gas resulting from combustion in the engine is supplied to an exhaust passage 116. Exhaust gas flows through the exhaust passage, and out of an exhaust stack of the vehicle. In one example, the engine is a diesel engine that combusts air and diesel fuel through compression ignition. In another example, the engine is a dual or multi-fuel engine that may combust a mixture of gaseous fuel and air upon injection of diesel fuel during compression of the air-gaseous fuel mix. In other non-limiting embodiments, the engine may additionally combust fuel including gasoline, kerosene, natural gas, biodiesel, or other petroleum distillates of similar density through compression ignition (and/or spark ignition).

In one embodiment, the vehicle is a diesel-electric vehicle. As depicted in FIG. 1, the engine may be coupled to an electric power generation system, which includes an alternator/generator 122, an energy storage device 123, and electric traction motors 124. For example, the engine is a diesel and/or natural gas engine that generates a torque output that is transmitted to the alternator/generator which is mechanically coupled to the engine. In one embodiment herein, the engine is a multi-fuel engine operating with diesel fuel and natural gas, but in other examples the engine may use various combinations of fuels other than diesel and natural gas.

In some examples, additionally or alternatively, the turbocharger system may include an electric turbocharger comprising an electric machine and/or a motor/generator. The motor/generator may be coupled to the energy storage device and configured to receive power from or send power to the energy storage device. In one example, the energy storage device is a battery.

The alternator/generator produces electrical power that may be stored and applied for subsequent propagation to a variety of downstream electrical components. As an example, the alternator/generator may be electrically coupled to a plurality of traction motors and the alternator/generator may provide electrical power to the plurality of traction motors. In some examples, the battery may be electrically coupled to the alternator/generator and the alternator/generator may draw power from and/or store power in the battery, depending on operating conditions. As depicted, each of the plurality of traction motors is connected to one of the plurality of wheels to provide tractive power to propel the vehicle. One example configuration includes one traction motor per wheel set. As depicted herein, six traction motors correspond to each of six pairs of motive wheels of the vehicle. In another example, alternator/generator may be coupled to one or more resistive grids 126. The resistive grids may dissipate excess engine torque via heat produced by the grids from electricity generated by alternator/generator.

The vehicle system may include a turbocharger system 120. The turbocharger system 120 may be coupled to the intake system and the exhaust system. In one example, the turbocharger system includes a first turbocharger and a second turbocharger. The first turbocharger may be identical to the second turbocharger. Additionally or alternatively, the first turbocharger may be different than the second turbocharger. In one example, the first turbocharger is a fluidic variable turbine (FVT) turbocharger and the second turbocharger is an assist turbocharger. As another example, the second turbocharger may be an electric turbocharger (e-turbo) and/or the second turbocharger may be only exhaust gas powered.

The assist turbocharger may be fluidly coupled to the FVT turbocharger and used to adjust an operating point thereof. A throat area of a nozzle of the FVT may be adjusted based on engine conditions and/or turbocharger conditions, such as an engine power level (e.g., power output) and/or an engine load, and/or a turbocharger speed and a turbocharger temperature. For example, when an engine power level is below a power level demand, a throat area of the nozzle may be decreased which may result in an increase in boost air provided to the engine by the turbocharger system, thus increasing the engine power level to meet the power level demand. The turbocharger system increases air charge of ambient air drawn into the intake passage in order to provide greater charge density during combustion to control power output and/or engine-operating efficiency. Further detail regarding the turbocharger system is described with respect to FIGS. 2A-7.

In some embodiments, the vehicle system may further include an aftertreatment system coupled in the exhaust passage upstream and/or downstream of the turbocharger system. In one embodiment, the aftertreatment system may include a diesel oxidation catalyst (DOC) and a diesel particulate filter (DPF). In other embodiments, the aftertreatment system may additionally or alternatively include one or more emission control devices. Such emission control devices may include a selective catalytic reduction (SCR) catalyst, three-way catalyst, NOx trap, or various other devices or exhaust aftertreatment systems.

As depicted in FIG. 1, the vehicle system further includes a cooling system 150 (e.g., engine cooling system). The cooling system circulates coolant through the engine to absorb waste engine heat and distribute the heated coolant to a heat exchanger, such as a radiator 152 (e.g., radiator heat exchanger). In one example, the coolant may be water. A fan 154 may be coupled to the radiator in order to maintain an airflow through the radiator when the vehicle is moving slowly or stopped while the engine is running. In some examples, fan speed may be controlled by the controller. Coolant which is cooled by the radiator may enter a tank (not shown). The coolant may then be pumped by a water, or coolant, pump 156 back to the engine or to another component of the vehicle system.

The controller may control various components related to the vehicle. As an example, various components of the vehicle system may be coupled to the controller via a communication channel or data bus. In one example, the controller includes a computer control system. The controller may additionally or alternatively include a memory holding non-transitory computer readable storage media (not shown) including code for enabling on-board monitoring and control of vehicle operation. In some examples, the controller may include more than one controller each in communication with one another, such as a first controller to control the engine and a second controller to control other operating parameters of the locomotive (such as tractive motor load, blower speed, etc.). The first controller may control various actuators based on output received from the second controller and/or the second controller may control various actuators based on output received from the first controller.

The controller may receive information from a plurality of sensors and may send control signals to a plurality of actuators. The controller, while overseeing control and management of the engine and/or vehicle, may receive signals from a variety of engine sensors, as further elaborated herein, in order to determine operating parameters and operating conditions, and correspondingly adjust various engine actuators to control operation of the engine and/or rail vehicle. For example, the engine controller may receive signals from various engine sensors including, but not limited to, engine speed, engine load, intake manifold air pressure, boost pressure, exhaust pressure, ambient pressure, ambient temperature, exhaust temperature, particulate filter temperature, particulate filter back pressure, engine coolant pressure, or the like. Additional sensors, such as coolant temperature sensors, may be positioned in the cooling system. Correspondingly, the controller may control the engine and/or the vehicle by sending commands to various components such as the power source, fuel injectors, valves of the turbocharger system, or the like. For example, the controller may control the operation of valves positioned on gas lines of the turbocharger system to direct boost air and exhaust gas to different elements of the turbocharger system, as further described herein with respect to FIGS. 4-7.

Turning now to FIG. 2A, it shows a first embodiment 200 of a turbine 202 of a FVT turbocharger, which may be used in the turbocharger system of FIG. 1. The turbine is referred to herein as a FVT, with respect to FIGS. 4-7. An axis system 290 is shown comprising three axes, namely an x-axis parallel to a horizontal direction, a y-axis parallel to a vertical direction, and a z-axis perpendicular to each of the x- and y-axes. The axes may be used in reference to describe shapes and orientations of components of the turbine.

The turbine includes a turbine housing 204 which may shape an exhaust gas inlet 206. The exhaust gas inlet may include a volute shape adapted to receive exhaust gas from a power source, such as the engine of FIG. 1. The volute shape of the exhaust gas inlet may distribute the exhaust gas around in a 360-degree manner to a turbine wheel (circle 209 indicates where a turbine wheel may be positioned within the turbine). The exhaust gas may rotate the turbine wheel, which may translate into rotation of a compressor wheel.

The turbine may further include a plurality of vanes 210 arranged adjacent to and surrounding the turbine wheel, around an entire circumference of the turbine wheel, along a nozzle ring 208. Together, the nozzle ring and the plurality of vanes may form a nozzle of the turbine (e.g., turbine nozzle) that guides exhaust flow to the turbine wheel. The plurality of vanes may be printed onto the nozzle ring in some examples, e.g., using an additive manufacturing or 3-D printer. Additionally or alternatively, the plurality of vanes may be assembled from a mold. The plurality of vanes may be fixed. For example, each vane may be stationary relative to a body of the nozzle ring (to which they are attached) and a central axis of the turbine wheel. Additionally, the plurality of vanes, inside the turbine, may be free of electrical, mechanical, pneumatic, hydraulic, and other types of actuators. The plurality of vanes may be free of moving parts, such as a sliding wall, slotted shroud, or other devices to adjust the turbine housing geometry. In one example, the vanes may be fixed relative to the nozzle ring such that when the ring rotates the vanes remain stationary. Additionally or alternatively, the vanes may rotate with a rotation of the nozzle ring, but may not rotate independent of the nozzle ring.

The plurality of vanes may be arranged around an entire circumference of the nozzle ring, between the turbine wheel and the exhaust gas inlet. The plurality of vanes may be shaped to adjust a geometry of the turbine based on one or more engine conditions, such as an engine power level. Air may be injected through one or more ports of the plurality of vanes, which may create a boundary layer of air. The boundary layer of air may reduce an effective throat area of the nozzle, which may adjust an operating point of the turbocharger. In one example, the boundary layer of air adjusts a geometry of the turbine housing to accelerate exhaust gas as it flows between the boundary layer and to the turbine blades, forcing the turbine blade to spin faster than it would without the boundary layer of air. When a current level of exhaust gas production is insufficient (e.g., an exhaust mass flow is below a threshold) to meet a current boost demand, such as during a lower engine power level or during a transient event, the boundary layer of air may be increased to increase the engine power level to meet a demanded power output.

Turning now to FIG. 2B, it shows a detailed view 250 of three vanes 260 of the plurality of vanes of FIG. 2A. More specifically, the three vanes include a first vane 260A, a second vane 260B, and a third vane 260C. The three vanes may each comprise individual central axes, which may also define a long axis of each vane, including a first vane central axis 262A, a second vane central axis 262B, and a third vane central axis 262C. The vanes may be angled relative to one another such that the central axes may be misaligned. In one example, the central axes are not parallel. The angle between each vane of the three vanes may be fixed in one example. In some embodiments, additionally or alternatively, the vanes may each be oriented differently such that an angle between the first and second vanes is different than an angle between the second and third vanes. In either case, the angle between adjacent vanes may not be adjusted due to the vanes being fixed once arranged on the nozzle ring.

The first, second, and third vanes may be substantially identical in size and shape and may be a single, continuous piece. More specifically, each vane may comprise a first extreme end 271 and a second extreme end 272, wherein a curvature of the second extreme end may be more pronounced than the first extreme end. As such, the first extreme end may be more pointed than the second extreme end. In this way, the vane may narrow as it extends from the second extreme end to the first extreme end.

The first and second extreme ends may be extreme ends of a vane body 273. The vane body may be solid, except for one or more interior air passages arranged therein for the one or more ports as will be described below. The vane body may comprise a first side wall 274 and a second side wall 275. The first side wall may be substantially identical to the second side wall in size and shape, except that the second side wall may be physically coupled to a portion of the turbine. The physical coupling may include one or more of bolts, adhesives, welds, and fusions to maintain the vanes stationary position. Each of the first and second side walls may extend from between the first extreme end and the second extreme end. The vane body, including the side walls, may comprise a paddle-like shape. In some examples, additionally or alternatively, the side walls may comprise an elongated teardrop shape.

Each vane may comprise a plurality of inlets, wherein the first vane comprises a first plurality of inlets 264A, the second vane comprises a second plurality of inlets 264B, and the third vane comprises a third plurality of inlets 264C. Each of the plurality of inlets may be arranged along the first side wall of the vanes, facing a direction opposite a turbine blade.

The first plurality of inlets may be shaped and/or configured to flow air to a first plurality of injection ports 266A arranged on an outer surface of the vane body of the first vane. The second plurality of inlets may be shaped and/or configured to flow air to a second plurality of injection ports 266B arranged on an outer surface of the vane body of the second vane. The third plurality of inlets may be shaped and/or configured to flow air to a third plurality of injection ports 266C arranged on an outer surface of the vane body of the third vane. Air may flow from an air source (such as a compressor, as shown in FIG. 4), through a flow control system arranged outside of the turbine, to the inlets, through one or more interior passages, and out the injection ports to form a boundary layer of air. Additionally or alternatively, the air supply may be partially or fully derived from the compressor of the turbocharger to the extent that the desired benefits may be achieved at various operating conditions.

The first vane, second vane, and third vane may be substantially identical. As such, the following description with regard to the first plurality of inlets and the first plurality of injection ports of the first vane may also be applied to the inlets and injection ports of the second and third vanes. The first plurality of inlets may be aligned along a common axis and arranged on the first side surface. Each inlet of the first plurality of inlets may comprise a circular shape. However, in alternate embodiments, the inlets may have a different shape, such as square, rectangular, or oblong. Each inlet of the first plurality of inlets may be similarly sized. The first plurality of inlets may receive air from the air source and direct the received air through an interior air passage of the first vane to a plurality of corresponding injection ports. In one example, the interior air passage extends in a direction perpendicular to the common axis and the central axis, wherein the interior passage is fluidly coupled only to injection ports arranged along its path, which may include a row of injection ports. That is to say, an inlet may be fluidly coupled to only one interior passage, and the interior passage may be fluidly coupled only to the injection ports aligned with an axis of the interior passage. Thus, in the example of the first vane, there may be four interior passages, wherein each of the interior passages is fluidly coupled to two injection ports. The interior passages may be machined and/or molded into the vane body. As such, the vane body may be solid except for the interior passages. In this way, fluid (e.g., air) in different interior passages may not mix. In one example, the first vane, excluding the inlets and interior passages but including the injection ports may comprise reflectional symmetry about the central axis. Additionally or alternatively, the first vane, excluding the injection ports but including the inlets and interior passages may comprise reflectional symmetry about the common axis.

More specifically, air from an air source may flow to the first plurality of inlets and to a first plurality of interior passages 268A which are fluidly coupled to the first plurality of injection ports. Air from the air source may flow to the second plurality of inlets and to a second plurality of interior passages 268B which are fluidly coupled to the second plurality of injection ports. Air from the air source may flow to the third plurality of inlets and to a third plurality of interior passage 268C which are fluidly coupled to the second plurality of injection ports.

Each of the interior passages may originate at a single inlet, wherein the interior passage may branch a number of times corresponding to a number of injection ports corresponding to the inlet, wherein the interior passage may terminate at each of the injection ports. In the example of FIG. 2B, there are two injection ports corresponding to each inlet, as such, each interior passage may branch twice from a common passage, wherein each of the two branches terminate at the injection ports. The interior passages of a single, shared vane may be fluidly separated from one another such that gas of a first interior passage does not mix with gas of a second interior passage. Additionally or alternatively, in some examples, the vane may be hollow and serve as a plenum for providing a desired air supply. The internal structure of the vane may comprise a unique geometry which results in a certain state of optimized flow which is presented to the inlet resulting in an increased effectiveness of throat reduction. The plurality of inlets may be configured such that each inlet corresponds to two or more injection ports of the plurality of injection ports. In the example of FIG. 2B, each inlet of the plurality of inlets corresponds to two injection ports. In one example, the first vane comprises four inlets, wherein each inlet is fluidly coupled to two injection ports. Thus, the first vane comprises eight injection ports divided into four groups and/or rows, where each group is fluidly coupled to a different one of the plurality of inlets. However, in alternate embodiments, there may be different numbers and shapes of injection ports.

Each of the plurality of injection ports may be arranged to inject air in a radially inward direction, angled to a central axis (dashed line 299) of the turbine wheel, perpendicular to a plane of the vane body. This may result in a reduction of a throat area of the nozzle ring. The inlets ports may be arranged on either side of the vane. That is to say, the inlet ports may be arranged on the side shown in FIG. 2B, or on an opposite side. Either iteration of inlet ports may be used depending on air flow behavior and desired throat nozzle characteristics. More specifically, a boundary layer of air may be formed as air flows through the pluralities of injection ports and into the nozzle ring. In this way, the boundary layer may decrease the nozzle ring opening via fluidic blocking, which may increase an acceleration of exhaust gas flowing to the turbine blade, which may allow the FVT turbocharger to realize higher amounts of boost. This may be demanded at lower engine loads and/or lower engine power, where mass flow may be lower than a threshold mass flow and unable to produce a determined amount of boost. As described further below, as an amount of air injected by a vane increases, the boundary layer may further increase (e.g., extend in a direction outward from the vane), further decreasing the nozzle throat area and increasing the acceleration of exhaust gas.

Turning now to FIGS. 3A and 3B, they show a first example 300 and a second example 350 of differently sized boundary layers of air formed by flowing air through and out of stationary vanes of a turbine nozzle (such as the vanes shown in FIGS. 2A-2B). More specifically, the first example shows a smaller boundary layer and the second example shows a larger boundary layer. Each of the examples comprises a first vane 302 directing air 322 toward a second vane 304. The air may flow from injection ports 306 of the first vane to the second vane, where a flow direction of the air is angled to a plane of the second vane and perpendicular to a plane of the first vane. The air may form a boundary layer, wherein an outer boundary of the boundary layer is shown via dashed line 308. Double headed arrow 312 illustrates a distance between the boundary layer and the second vane of the first example. Double headed arrow 314 illustrates a distance between the boundary layer and the second vane of the second example. As shown, the distance between the second vane and the boundary layer in the first example is greater than the distance between the second vane and the boundary layer in the second example. More specifically, the double headed arrow is bigger than the double headed arrow due to less air flowing in the first example compared to the second example. As a result, exhaust gas 324 flowing through the space between the second vane and the boundary layer in the first example may accelerate less than exhaust gas flowing through the space between the second vane and the boundary layer in the second example. As such, the second example may provide more boost than the first example with an equal volume of exhaust gas. In this way, the geometry of the turbine nozzle may be adjusted via vane airflow alone and not by mechanically adjusting a position of the vanes.

Turning to FIG. 4, a turbocharger system 400 is shown which includes a first turbocharger 402 and a second turbocharger 412. The turbocharger system is coupled to a power source 422. For example, the power source may be an example of the engine of FIG. 1, and is referred to herein as an engine. The turbocharger system may be an example of the turbocharger system of FIG. 1. The first turbocharger is a FVT turbocharger, and may be interchangeably referred to as such herein. In some examples, a first turbine 406 (e.g., may be interchangeably referred to as the FVT) of the FVT turbocharger may be used similarly to the turbine of FIGS. 2A-3B and includes a nozzle 408 which has an adjustable throat area. The second turbocharger is referred to as an assist turbocharger, and may be a FVT turbocharger, a VGT turbocharger, or a turbocharger having only a turbine and a compressor.

A first portion of boost air from a first compressor 404 of the first turbocharger may be directed to the power source and a second potion of boost air from the first compressor is directed to a second compressor 414 of the second turbocharger. Boost air from the second compressor is directed to the nozzle of the FVT, to adjust a throat area of the nozzle. This may adjust an exhaust gas acceleration which is passing through the FVT, thus adjusting boost generated by the first compressor. In one example, when the nozzle area of the FVT is decreased, a first compressor speed may increase, which may increase boost pressure. By doing this, an increase in a power output and efficiency of the power source may be achieved.

The first turbine is at least partially fluidly driven by the second compressor of the assist turbocharger. The throat area of the nozzle of the first turbine may be fluidically adjusted by flowing gas into the nozzle. When the throat area is increased, exhaust gases from the power source passing through the first turbine may supply less energy to rotate the first turbine compared to exhaust gases passing through the first turbine when the throat area is reduced.

The assist turbocharger includes the second compressor which may be at least partially driven by a second turbine 416. The second compressor is mechanically linked to the second turbine by a shaft 420 of the assist turbocharger, such that rotation of a turbine wheel of the second turbine translates into rotation of the shaft, which further translates into rotation of the second compressor.

In one embodiment, the assist turbocharger may be an electric turbocharger, where an electric motor/generator 426 is mechanically coupled to the shaft between the second compressor and the second turbine. The motor/generator may motor the shaft (e.g., increase rotational speed) to increase a work output of the second compressor, or slow the shaft (e.g., decrease rotational speed) to extract energy. While operating in a motoring mode, the second compressor may provide additional airflow to the nozzle of the first turbine. When in a generating mode, the motor/generator may slow the shaft speed and provide extracted power to an energy storage device. Additionally or alternatively, the electrical energy may be used to power one or more accessory devices of the vehicle. In one example, the motor/generator may power at least one wheel.

The first compressor is coupled to the second compressor and the power source via a first gas line 430. A first valve 432 in the first gas line may control air flow from the first compressor to each of the power source and the second compressor. As such, the first valve may selectively open or close a first gas inlet, which is coupled to the first compressor and the power source, and a second compressor inlet 431, which is coupled to the first valve and the second compressor.

The first valve may be a multi-position valve that controls boost air flow from the first compressor to the power source and the second compressor. A first position of the first valve may flow boost air to the power source and block boost air from flowing to the second compressor. A second position of the first valve may flow boost air to both the power source and the second compressor. A third position may flow boost air to only the second compressor and block boost air from flowing to the engine. In one embodiment, the power source may include a second air inlet for receiving air such that air flow to the power source is optionally maintained when the first valve is in the third position. Each of the first position, the second position, and third position may be variable such that a mass flow of boost air is adjustable. For example, if the second position is in a more closed position, then more boost may flow to the second compressor and less boost may flow to the power source. If the second position is in a more open position, then more boost may flow to the power source and less boost may flow to the second compressor. If the second position is approximately half open and half closed, approximately equal amounts of boost may flow to the power source and to the second compressor.

Exhaust gas resulting from combustion in the power source may flow into a second gas line 434. A second valve 436 may be positioned in the second gas line. The second valve may adjust exhaust gas flow to the first turbine and the second turbine. A second turbine inlet 435 may fluidly couple the second valve to the second turbine. Exhaust gases downstream of the second valve in the second gas line may flow to only the first turbine and exhaust gases downstream of the second valve in the second turbine inlet may flow to only the second turbine.

The second valve may be a multi-position valve that controls exhaust gas flow from the power source to the first turbine (e.g., the FVT) and the second turbine. A first position of the second valve may flow exhaust gas to the first turbine and block exhaust gas from flowing to the second turbine. A second position of the second valve may flow exhaust gas to both the first turbine and the second turbine. In some examples, the second valve may include a third position, which may flow exhaust gas to only the second turbine and block exhaust gas from flowing to the first turbine. Each of the first position, the second position, and the third position may be variable such that a mass flow of exhaust gas is adjustable. For example, if the first position is in a more closed position, then more exhaust gas may flow to a first turbine bypass and less exhaust gas may flow to the first turbine. If the first position is in a more open position, then more exhaust gas may flow to the first turbine and less exhaust gas may flow to the first turbine bypass. In this way, the second valve may be a multi-position valve with wastegate capabilities.

When the first valve is in the second position and the second valve is in the second position, the second compressor may compress boost air received from the first compressor. For example, exhaust gas from the power source may be directed to the second turbine, which may cause rotation of the second turbine. The boost provided to the second compressor may further increase a shaft speed relative to a shaft speed of the first turbocharger. Heat and kinetic energy in the exhaust gas may thus be converted into mechanical energy. The mechanical energy may be used to drive the second compressor of the assist turbocharger, and the second compressor may compress air (e.g., boost air from the first compressor).

Following compression by the second compressor, boost air may flow to the nozzle of the first turbine via a third gas line 440. In one example, the third gas line is a second compressor outlet. In some embodiments, additionally or alternatively a third valve 442 may be positioned in the third gas line. A first turbine nozzle inlet 443 may fluidly couple the third valve to the nozzle of the first turbine. Based on a position of the third valve, boost air may flow to the nozzle via the first turbine nozzle inlet or to the first turbine (e.g., to the turbine wheel) via a first turbine inlet 444 to supplement the exhaust gas flow from the power source. In other examples, additionally or alternatively, the third valve may be omitted and the second compressor may be fluidly coupled to only the nozzle of the first turbine. Thus, in one example, the second compressor may be fluidly coupled to only the first compressor and the nozzle of the first turbine, and may not receive gases from or expel gases to any other source.

The third valve may be a multi-position valve that controls boost air flow from the second compressor to the nozzle of the first turbine and/or to the first turbine (e.g., the turbine wheel of the first turbine). A first position of the third valve may flow boost air from the second compressor to only the nozzle. A second position of the third valve may flow boost air to both the nozzle and to the first turbine. Each of the first position and the second position may be variable such that a mass flow of boost air is adjustable. For example, if the second position is in a more closed position, then more boost may flow to the nozzle and less boost may flow to the first turbine. If the second position is in a more open position, then more boost may flow to the first turbine and less boost may flow to the nozzle. If the second position is approximately half open and half closed, approximately equal amounts of boost may flow to the nozzle and flow to the first turbine. In some examples, the third valve may include a third position, which may flow boost air out to only the first turbine and block boost air from flowing to the nozzle. The flow of boost air from the second compressor into the nozzle may reduce the throat area of the nozzle, thus reducing an effective area of the nozzle and increasing mass flow into the nozzle.

The turbocharger system further includes a fourth line 452, which directly couples the first turbine to the exhaust passage. A second turbine outlet 454 may fluidly couple the second turbine to the exhaust passage. In some embodiments, a fourth valve 450 is positioned on the fourth line. The fourth valve may be a multi-position valve that controls discharge air flow out of the turbocharger system (e.g., to the exhaust passage). The fourth valve may be configured to allow exhaust gases from each of the first and second turbine to flow to the exhaust passage in a first position. In a second position, the fourth valve may seal the second turbine so that the first turbine may flow exhaust gases to the exhaust passage without flowing the exhaust gases into the second turbine due to a pressure differential.

During a first condition, it may be determined that the first turbocharger speed is equal to a determined speed and meets a boost demand of the power source. In this case, the first valve and the second valve are each adjusted to the respective first position to bypass the second turbocharger by blocking a flow of boost air and exhaust gas to the second compressor and the second turbine, respectively.

During a second condition, it may be determined that the second turbocharger speed is less than the determined speed and a boost demand of the power source is not met via operation of only the first turbocharger. As such, the first valve and the second valve may be adjusted to flow boost and exhaust gas to the second turbocharger, wherein the second turbocharger may increase the first turbocharger speed toward the determined speed. The second turbocharger does not flow boost to the power source during the second condition or other operating conditions.

Thus, FIG. 4 illustrates an example system including a first turbocharger and a second turbocharger. The first turbocharger includes a first compressor fluidly coupled to a second compressor of the second turbocharger. The second compressor may receive air from only the first compressor, in one example. The second compressor may further pressurize boost air and flow the boost air to only a first turbine coupled to the first compressor of the first turbocharger, in one example. By doing this, a speed of the first turbocharger may increase and an engine power output may increase. In some examples, if the first turbocharger speed is equal to a determined speed, the determined speed based on a current load, then the first valve may be actuated to the first position and block boost from flowing to the second compressor. As such, the first compressor may only flow boost air to the engine when the first turbocharger speed is equal to the determined speed. Additionally, the fourth valve may be moved to a second position and seals the second turbine from the exhaust passage. By doing this, exhaust gases may not backflow into the second turbine. If the first turbocharger speed deviates from the determined speed, then operation of the valves and the second turbocharger may be adjusted, as described below.

Turning to FIG. 5, a method 500 is shown for adjusting a power output of the power source by controlling an amount of compressed air input into the power source. Instructions for carrying out the method and other methods included herein may be executed by a controller (e.g., the controller shown in FIG. 1) based on instructions stored on a memory of the controller and in conjunction with signals received from sensors of the engine system, such as the sensors described above with reference to FIG. 1. The controller may employ engine actuators of the engine system to adjust valve positions, according to the methods described below, such as the first valve, the second valve, the third valve, and the fourth valve of the turbocharger system of FIG. 4. Additionally, the controller may employ engine actuators of the engine system to adjust engine operation, according to the methods described below, such as injection pressure (e.g., of boost air from the second compressor to the nozzle) to achieve a determined boost pressure from the first compressor, the determined boost pressure based on one or more of a power output demand, a turbocharger speed, and a turbocharger temperature.

The method begins at 502, which includes determining, estimating, and/or measuring one or more operating parameters. The one or more operating parameters may include but are not limited to one or more of a power source power output (e.g., notch level of an engine), power demand, mass air flow, boost, exhaust pressure, and air/fuel ratio, and so on. In some examples, the method may be implemented when the power source is being operated without boost, e.g., when the first valve is in the first position, the second valve is in the first position, and the third valve is in the third position. In other examples, the method may be implemented when the power source is being operated with boost.

The method proceeds to 504, which includes determining if the first turbocharger speed is equal to a determined speed. The determined speed may be based on a current engine load (e.g., notch setting) or other operating condition. If the first turbocharger speed is equal to the determined speed, then at step 506, the method may include maintaining the first valve in the first position. In one example, when the first turbocharger speed is equal to the determined speed, a first condition may be present, wherein operation of the second turbocharger is not demanded and gas flow to the second turbocharger is blocked.

At step 507, the method may include maintaining the second valve in the first position and the fourth valve in the second position. As such, the second compressor may not receive boost air from the first compressor, the second turbine may not receive exhaust gas from the power supply, and exhaust gases may not backflow from the exhaust passage into the second turbine. In this way, a boost demand is met via only operating the first turbocharger. The second turbocharger remains inactive.

If it is determined at step 504 that the first turbocharger speed is not equal to the determined speed, at step 508, the method includes determining if the first turbocharger speed is greater than the determined speed. The first turbocharger speed may be greater than the determined speed due to a deceleration event following a high load, a compressor run-off, or other condition.

If it is determined that the first turbocharger speed is not greater than the determined speed, then at step 510, the method includes adjusting the first valve to the second position. As such, the first valve fluidly couples the first compressor of the FVT turbocharger to the power source and to the second compressor of the assist turbocharger.

At step 512, the method includes adjusting the second valve to the second position. When in the second position, the second valve fluidly couples the power source to the second turbine of the assist turbocharger and to the first turbine (e.g., the FVT) of the first turbocharger. A first amount of exhaust is directed from the power source into the second turbine and a second amount of exhaust is directed from the power source into the first turbine of the first turbocharger. In some examples, the first amount of exhaust and the second amount of exhaust may be the same, while in other examples, they may be different amounts. The second valve may be adjusted throughout a range (e.g., 1 to 99% open) within the second position to modify the amounts of exhaust gas flowing to the first and second turbines. More open positions (e.g., between 50 and 99%) may flow more exhaust gas to the first turbine relative to the second turbine. More closed positions (e.g., between 1 and 50%) may flow more exhaust gas to the second turbine relative to the first turbine.

In one example, when the first turbocharger speed is less than the determined speed, a second condition is present and the power source power output is less than a demanded output. As such, the second turbocharger may be operated to increase the first turbocharger speed, which may increase the power source power output toward the demanded output.

At step 514, the method includes flowing boost from the second compressor to the first turbine nozzle. In some examples, flowing boost from the second compressor may include adjusting the third valve to the first position or to the second position. The first position fluidly couples the second compressor to only the nozzle of the first turbine. The second position fluidly couples the second compressor to the nozzle of the first turbine and to the first turbine (e.g., the turbine wheel of the first turbine). Injecting boost air into the turbine nozzle may create a boundary layer of air, which may amplify a force of exhaust gases flowing thereto. By doing this, a first turbocharger speed may increase to a value higher than allowed with a current exhaust mass flow. Faster rotation of the turbine wheel of the first turbine may translate into faster rotation of a compressor wheel of the first compressor, thus providing more compressed air to the power source.

At step 516, the method includes determining if the power output is equal to the power demand. If it is determined that the power output is equal to the power demand, the method proceeds to step 524 to maintain operating parameters.

If it is determined that the power output is still less than and not equal to the power demand, the method proceeds to step 526 to adjust boost and exhaust flow to the second turbocharger. In some examples, additionally or alternatively, a motor/generator of the first turbocharger may be activated in a motoring mode to further increase the first turbocharger speed.

Returning to step 508, if it is determined that the first turbocharger speed is greater than the determined speed, the method proceeds to step 518, which may include flowing excess boost to the second compressor. Excess boost may be defined as an amount of boost generated by the first turbocharger that exceeds a boost demand of the power source. As such, the first valve may be actuated to the second position, wherein a magnitude of an opening/closing is based on the amount of excess boost.

At step 520, the method may include adjusting the third valve to a third position. As such, boost air from the second compressor is blocked from flowing to the nozzle of the first turbine. The boost air from the second compressor may be directed to one or more the first turbine (e.g., the turbine wheel), an exhaust passage, a boost reservoir, and atmosphere.

At step 522, the method may include adjusting the second valve to flow less exhaust gas to the first turbine. As such, an opening of the second valve in the first position may be reduced. By doing this, a boost demand may be met as the first turbocharger speed is reduced. This may improve power source operating parameters and efficiency.

Turning to FIG. 7, it shows an optional method 700 for adjusting operation of the turbochargers and valves of the turbocharger system to generate power from the first turbocharger in response to an electrical power demand being present. The method begins at step 702, which includes determining operating parameters. Operating parameters may include, but are not limited to, one or more of an engine load, a manifold pressure, a substitution rate, an air/fuel ratio, and a mass air flow.

At step 704, the method may include determining a battery SOC. The battery SOC may be determined via a multimeter. Additionally or alternatively, the battery SOC may be estimated based on a model tracking electric energy consumption and regeneration.

At step 706, the method may include determining if an electrical power demand is present. In one example, the electrical power demand may be present if the battery SOC is less than a threshold SOC. The threshold SOC may be based on a determined percentage of full battery charge. For example, the threshold SOC may be 90% of a 100% battery SOC. Additionally or alternatively, the threshold SOC may be based on a charge used for one or more electrical functions such as powering various auxiliary components. The electrical power demand may further be present based on an auxiliary component operation, wherein the auxiliary component operation consumes electrical power. Additionally or alternatively, during certain conditions based on load, traction, and the like, one or more wheels may be driven via electrical power.

If electrical power is not demanded, then at step 708, the method may include maintaining current operating parameters. The speed of the first turbocharger is not increased to a speed above the determined speed and the motor/generator does not generate off the first turbocharger. The steps of the method of FIG. 5 may be used to control turbocharger system operation.

If electrical power is demanded, then at step 710, the method may include intrusively increasing the first turbo speed above the determined speed.

At step 712, the method may include flowing boost to the second compressor of the second turbocharger.

At step 714, the method may include adjusting the third valve based on the first turbocharger speed and a limit speed. The limit speed may be a predefined upper limit speed of the first turbocharger, wherein turbocharger speeds above the limit speed may result in degradation to the first turbocharger. As such, the third valve may be adjusted to flow at least a portion of the boost from the second turbocharger to the nozzle of the first turbine to increase the first turbocharger speed toward the limit speed. The third valve may be further adjusted to flow excess boost (e.g., boost beyond the amount used to increase the first turbocharger speed to the limit speed) to the turbine wheel of the first turbine, the exhaust passage, the reservoir, or atmosphere.

At step 716, the method may include generating off the first turbocharger via the motor/generator. As such, the motor/generator is operated in a generating mode and it slows the rotation of the shaft of the first turbocharger. In one example, a magnitude of power generation during the generating mode may be proportional to the electrical power demand. For example, if the electrical power demand is relatively high, then the magnitude of power generation may also be relatively high.

Additionally or alternatively, boost flow from the second compressor to the first turbine may be further adjusted based on the magnitude of power generation. For example, the third valve may flow an amount of boost to the first turbine that may result in the first turbocharger speed exceeding the limit speed. However, the motor/generator slows the first turbocharger speed when in the generating mode such that the limit speed is not exceeded.

At step 718, the method may include flowing electrical power to an electrical power consumption device and/or to the energy storage device. In this way, the battery SOC may increase and/or the electrical power consumption device may be driven via electricity, which may increase a fuel economy of the vehicle.

Turning now to FIG. 6, an engine operating sequence 600 is shown, illustrating operating conditions of a power source (e.g., the engine of FIG. 1) executing a method for adjusting an effective throat area of a FVT based on the method of FIG. 5. Plot 610 illustrates a power source power output, which may be similar to an engine load and/or notch level of an engine when the power source is an engine, and plot 612 illustrates a power demand. During some instances, plot 610 may track plot 612 and as such, the two plots may overlap, thereby illustrating an equivalence between the two plots. In one example, additionally or alternatively, the power demand may be proportional to a determined speed of the first turbocharger and the power source power output may be proportional to a first turbocharger speed. Plot 620 illustrates a current boost provided by the first turbocharger and plot 622, shown in dashed lines, illustrates a current boost provided by the second turbocharger. During some instances, plot 622 may track plot 620 and as such, the two plots may overlap, thereby illustrating an equivalence between the two plots. Plot 630 illustrates a position of the first valve, plot 640 illustrates a position of the second valve, plot 650 illustrates a position of the third valve, and plot 660 illustrates a position of the fourth valve. Plot 670 illustrates an effective throat area of the turbine. Time increases from a left to right side of the figure.

Prior to t1, the power source power output is relatively high and equal to a power demand. For example, the power output prior to time t1 may represent a full load condition. The first valve is in the first position, directing boost air to the power source. The second valve is in the first position, directing exhaust gas to the FVT of the first turbocharger. The third valve is in the second position, directing discharge air from the second compressor to the first turbine (e.g., the turbine wheel). The fourth valve is in the first position to flow discharge air from the second compressor and the second turbine out of the turbocharger system and block discharge air from flowing to the first turbine. As a result, boost from the first turbocharger is greater than boost from the second turbocharger. Exhaust gas production prior to t1 and valve positions are configured to generate sufficient boost to meet the power demand without adjusting the effective throat area of the FVT. Further, the nozzle ring including the nozzle vanes may be optimized for full load operation (e.g., the vanes may be positioned on the nozzle vane for increased efficiency at full load operation when airflow through the turbine is relatively high). At t1, the power source power output begins to decrease.

Between t1 and t2, the power source power output continues to decrease while the power demand remains the same as prior to t1. The efficiency of the FVT at the current, lower level of exhaust gas production may be reduced and may not be able to meet a boost demand used to increase the power demand, and as a result, the boost from the first turbocharger (e.g., the FVT) decreases. At t2, the first valve is adjusted to the second position, the second valve is adjusted to the second position, the third valve is adjusted to the first position, and the fourth valve is adjusted to the second position.

Between t2 and t3, air may flow through inlets of the vanes of the nozzle from the second compressor. As such, injection ports fluidly coupled to the inlets receiving air may begin to flow air adjacent the turbine nozzle and form a boundary layer of air. As the size of the boundary layer of air increases, the effective throat area of the turbine decreases, thereby accelerating exhaust gas flowing toward a turbine blade and increasing boost provided by a current level of exhaust gas production. Boost from both the first turbocharger and the second turbocharger increase, and the power output increases.

At t3, the power output continues to increase and becomes greater than the power demand between t3 and t4. The third valve is variably adjusted in the first position to vary an amount of boost air which is flowing to the nozzle and is flowing to the turbine wheel of the first turbine. For example, the third valve may be adjusted to flow more boost air to the nozzle. The first valve may be maintained in the second position and the second valve may be maintained in the second position.

At t4, the power output is greater than the power demand. As the power output increases, the exhaust gas produced may increase, thereby resulting in less demand for the effect of the exhaust gas to be amplified by a reduced effective throat area. As such, the first valve adjusts to the first position. The second valve is maintained in the second position, and the third valve adjusts to the second position. The fourth valve is adjusted to the third position to flow discharge air from the second compressor, the second turbine, and the first turbine out of the turbocharger system. In this way, the effective throat area increases to prevent too much boost production. The power output gradually decreases as the turbocharger speeds decrease.

One embodiment of the system described herein comprises an engine, a first turbocharger including a first compressor and a first FVT with a FVT having a nozzle with an adjustable throat area, and a second turbocharger including a second turbine and a second compressor. The engine, the first turbocharger, and the second turbocharger are fluidically coupled. The embodiment may further include a controller including computer-readable instructions stored on memory that, when executed, cause the controller to adjust a position of a first valve on a first gas line coupling the first turbocharger, the second turbocharger, and the engine to flow a first portion of a total amount of a compressor discharge stream (e.g., a first portion of boost air) from the first compressor of the first turbocharger to the second compressor of the second turbocharger and further to the FVT nozzle. The first compressor may flow a second portion of the total amount of the compressor discharge stream (e.g., a second portion of boost air) to the engine. The second portion may be directed out of the engine by a second valve arranged on a second fluid line coupling the engine, the second turbine, and the first FVT. The throat area of the nozzle may be reduced by injecting the first portion of boost air into the FVT nozzle. Exhaust gas from the engine which is injected into the first FVT is accelerated trough the FVT nozzle, therefore increasing mechanical output of the first FVT and increasing compression performed by the first compressor, which is driven by the first FVT. This increases compressed air input into the engine which may result in an increase in power output and/or efficiency of the engine.

An example method for the system described herein comprises compressing gas at a first compressor of a first turbocharger, adjusting a position of a first valve to flow a first portion of boost air from the first compressor of the first turbocharger to a second compressor of a second turbocharger, compressing the first portion of boost air at the second compressor, and flowing the first portion of boost air to a fluidic variable turbine (FVT) nozzle of a first FVT turbine of the first turbocharger.

In this way, an effective area of a FVT nozzle is reduced, mass flow through a first turbine of a first turbocharger is increased via a combination of injected air through the FVT nozzle and exhaust driving the first turbine, and a power output of the first turbine is increased.

The disclosure also provides support for a turbocharger system coupled to a power source, the turbocharger system comprising: a first turbocharger having a first compressor and a first turbine, and a second turbocharger having a second compressor and a second turbine, where boost air from the second compressor is directed to only a nozzle of the first turbine. In a first example of the system, boost air from the first compressor flows to the second compressor. In a second example of the system, optionally including the first example, the system further comprises: a first valve positioned in a first gas line, the first valve configured to adjust boost air flow from the first compressor to the power source and the second compressor, and a second valve positioned in a second gas line, the second valve configured to adjust exhaust gas flow from the power source to the first turbine and to the second turbine. In a third example of the system, optionally including one or both of the first and second examples, the second compressor receives gases from only the first compressor. In a fourth example of the system, optionally including one or more or each of the first through third examples, a second compressor inlet of the second compressor is sealed from atmosphere. In a fifth example of the system, optionally including one or more or each of the first through fourth examples, the first turbine is one of a fluidic variable turbine or a variable geometry turbine. In a sixth example of the system, optionally including one or more or each of the first through fifth examples, the second compressor flows boost air to only the nozzle of the first turbine. In a seventh example of the system, optionally including one or more or each of the first through sixth examples, the first compressor is mechanically driven by the first turbine and the second compressor is mechanically driven by the second turbine. In an eighth example of the system, optionally including one or more or each of the first through seventh examples, the first turbine is at least partially fluidly driven by the second compressor.

The disclosure also provides support for a method, comprising: during a first condition, flowing boost air from a first compressor to a power source, and during a second condition, flowing boost air from the first compressor to the power source and to a second compressor, wherein the second compressor flows boost air to a nozzle of a first turbine coupled to the first compressor via a shaft of a first turbocharger. In a first example of the method, the first condition comprises a speed of the first turbocharger being equal to a determined speed, and wherein boost air from the first compressor is blocked from flowing to the second compressor via a valve, and wherein the first condition further comprises blocking exhaust gas from the power source to a second turbine coupled to the second compressor via a shaft of a second turbocharger. In a second example of the method, optionally including the first example, the second condition comprises a speed of the first turbocharger being less than a determined speed, and wherein boost air from the first compressor is directed to each of the power source and the second compressor, and wherein the second condition further comprises flowing exhaust gas from the power source to a second turbine coupled to the second compressor via a shaft of a second turbocharger. In a third example of the method, optionally including one or both of the first and second examples, the second condition comprises where the second compressor is fluidly coupled to only the first compressor and the nozzle of the first turbine. In a fourth example of the method, optionally including one or more or each of the first through third examples, the second condition further comprises adjusting a valve in an exhaust passage to flow exhaust gases from the first turbine and a second turbine coupled to the second compressor via a shaft of a second turbocharger to the exhaust passage. In a fifth example of the method, optionally including one or more or each of the first through fourth examples, the first condition further comprises adjusting a valve in an exhaust passage to flow exhaust gases from the first turbine to the exhaust passage, and wherein the valve seals a second turbine coupled to the second compressor via a shaft of a second turbocharger from the exhaust passage.

The disclosure also provides support for a system, comprising: a first turbocharger fluidly coupled to a power source and to a second turbocharger, where the second turbocharger receives boost from the first turbocharger and flows boost to a nozzle of a first turbine of the first turbocharger. In a first example of the system, an inlet of a second compressor of the second turbocharger is fluidly coupled to only a first compressor of the first turbocharger. In a second example of the system, optionally including the first example, an outlet of a second compressor of the second turbocharger is fluidly coupled to only the first turbine. In a third example of the system, optionally including one or both of the first and second examples, the system further comprises: a controller with computer-readable instructions stored on memory thereof that when executed enable the controller to: during a first condition, flow boost air from a first compressor of the first turbocharger to only the power source and block boost air from the first compressor to the second turbocharger via a first valve, further comprising flowing exhaust gas to only the first turbine and blocking exhaust gas from the power source to the second turbocharger via a second valve, and during a second condition, flow boost air to from the first compressor to each of the power source and the second turbocharger via the first valve, further comprising flowing exhaust gas to the first turbine and the second turbocharger via the second valve. In a fourth example of the system, optionally including one or more or each of the first through third examples, the power source is an engine, and wherein the second turbocharger is smaller than the first turbocharger.

In one embodiment, the control system, or controller, may have a local data collection system deployed and may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. The tasks may be machine learning problems such as classification, regression, clustering, density estimation, dimensionality reduction, anomaly detection, and the like. In examples, machine learning may include a plurality of mathematical and statistical techniques. The machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components are restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and control, behavior analytics, and the like.

In one embodiment, the controller may include a policy engine that may apply one or more policies. These policies may be based at least in part on characteristics of a given item of equipment or environment. With respect to control policies, a neural network can receive input of a number of environmental and task-related parameters. The neural network can be trained to generate an output based on these inputs, with the output representing an action or sequence of demanded actions of the engine system. This may be useful for balancing competing constraints on the engine. During operation of one embodiment, a determination can occur by processing the inputs through the parameters of the neural network to generate a value at the output node designating that action as the desired action. This action may translate into a signal that causes the engine to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes. These may be weighed relative to each other.

As used herein, an element or step recited in the singular and preceded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "that includes," "including," or "having" an element or a plurality of elements having a particular property may include additional such elements not having that property. The terms "including" and "in which" are used as the plain-language equivalents of the respective terms "that includes" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A turbocharger system coupled to a power source, the turbocharger system comprising:
   a first turbocharger having a first compressor and a first turbine; and
   a second turbocharger having a second compressor and a second turbine, where boost air from the second compressor is directed to only a nozzle of the first turbine.

2. The turbocharger system of claim 1, wherein boost air from the first compressor flows to the second compressor.

3. The turbocharger system of claim 1, further comprising:
   a first valve positioned in a first gas line, the first valve configured to adjust boost air flow from the first compressor to the power source and the second compressor; and
   a second valve positioned in a second gas line, the second valve configured to adjust exhaust gas flow from the power source to the first turbine and to the second turbine.

4. The turbocharger system of claim 1, wherein the second compressor receives gases from only the first compressor.

5. The turbocharger system of claim 1, wherein a second compressor inlet of the second compressor is sealed from atmosphere.

6. The turbocharger system of claim 1, wherein the first turbine is one of a fluidic variable turbine or a variable geometry turbine.

7. The turbocharger system of claim 1, wherein the second compressor flows boost air to only the nozzle of the first turbine.

8. The turbocharger system of claim 1, wherein the first compressor is mechanically driven by the first turbine and the second compressor is mechanically driven by the second turbine.

9. The turbocharger system of claim 1, wherein the first turbine is at least partially fluidly driven by the second compressor.

10. A method, comprising:
    during a first condition, flowing boost air from a first compressor to a power source; and
    during a second condition, flowing boost air from the first compressor to the power source and to a second compressor, wherein the second compressor flows boost air to a nozzle of a first turbine coupled to the first compressor via a shaft of a first turbocharger.

11. The method of claim 10, wherein the first condition comprises a speed of the first turbocharger being equal to a determined speed, and wherein boost air from the first compressor is blocked from flowing to the second compressor via a valve, and wherein the first condition further comprises blocking exhaust gas from the power source to a second turbine coupled to the second compressor via a shaft of a second turbocharger.

12. The method of claim 10, wherein the second condition comprises a speed of the first turbocharger being less than a determined speed, and wherein boost air from the first compressor is directed to each of the power source and the second compressor, and wherein the second condition further comprises flowing exhaust gas from the power source to a second turbine coupled to the second compressor via a shaft of a second turbocharger.

13. The method of claim 10, wherein the second condition comprises where the second compressor is fluidly coupled to only the first compressor and the nozzle of the first turbine.

14. The method of claim 10, wherein the second condition further comprises adjusting a valve in an exhaust passage to flow exhaust gases from the first turbine and a second turbine coupled to the second compressor via a shaft of a second turbocharger to the exhaust passage.

15. The method of claim 10, wherein the first condition further comprises adjusting a valve in an exhaust passage to flow exhaust gases from the first turbine to the exhaust passage, and wherein the valve seals a second turbine coupled to the second compressor via a shaft of a second turbocharger from the exhaust passage.

16. A system, comprising:
    a first turbocharger fluidly coupled to a power source and to a second turbocharger, where the second turbocharger receives boost from the first turbocharger and flows boost to a nozzle of a first turbine of the first turbocharger.

17. The system of claim 16, wherein an inlet of a second compressor of the second turbocharger is fluidly coupled to only a first compressor of the first turbocharger.

18. The system of claim 16, wherein an outlet of a second compressor of the second turbocharger is fluidly coupled to only the first turbine.

19. The system of claim 16, further comprising a controller with computer-readable instructions stored on memory thereof that when executed enable the controller to:
    during a first condition, flow boost air from a first compressor of the first turbocharger to only the power source and block boost air from the first compressor to the second turbocharger via a first valve, further comprising flowing exhaust gas to only the first turbine and blocking exhaust gas from the power source to the second turbocharger via a second valve; and
    during a second condition, flow boost air to from the first compressor to each of the power source and the second turbocharger via the first valve, further comprising flowing exhaust gas to the first turbine and the second turbocharger via the second valve.

20. The system of claim 16, wherein the power source is an engine, and wherein the second turbocharger is smaller than the first turbocharger.

* * * * *